United States Patent
Tzeng et al.

(10) Patent No.: US 7,131,781 B2
(45) Date of Patent: Nov. 7, 2006

(54) KEYBOARDS

(75) Inventors: Shu-Wen Tzeng, Jhubei (TW); Chun-Chung Huang, Taipei (TW)

(73) Assignee: Darfon Electronics Corp., Kweishan Taoyuan (TW)

( * ) Notice: Subject to any disclaimer, the term of this patent is extended or adjusted under 35 U.S.C. 154(b) by 121 days.

(21) Appl. No.: 10/979,472

(22) Filed: Nov. 2, 2004

(65) Prior Publication Data

US 2005/0100382 A1 May 12, 2005

(30) Foreign Application Priority Data

Nov. 11, 2003 (TW) ............... 92131491 A
Feb. 13, 2004 (TW) ............... 93103471 A

(51) Int. Cl.
*B41J 5/08* (2006.01)
*G06F 3/023* (2006.01)

(52) U.S. Cl. ...................... 400/492; 400/488
(58) Field of Classification Search ........ 400/492, 400/486, 488, 489, 491.2; 361/681
See application file for complete search history.

(56) References Cited

U.S. PATENT DOCUMENTS

| | | | | |
|---|---|---|---|---|
| 5,067,834 A | * | 11/1991 | Szmanda et al. | 400/489 |
| 5,163,824 A | * | 11/1992 | Kantner | 418/153 |
| 5,564,844 A | * | 10/1996 | Patterson et al. | 400/492 |
| 5,576,929 A | * | 11/1996 | Uchiyama et al. | 361/680 |
| 5,669,722 A | * | 9/1997 | Overthun et al. | 400/489 |
| 5,733,056 A | * | 3/1998 | Meagher | 400/472 |
| 5,754,395 A | * | 5/1998 | Hsu et al. | 361/680 |
| 5,951,179 A | * | 9/1999 | Zarek | 400/492 |
| 6,681,926 B1 | * | 1/2004 | DeVolpi | 206/224 |
| 6,762,931 B1 | * | 7/2004 | Chen | 361/683 |
| 6,839,226 B1 | * | 1/2005 | Chen | 361/680 |
| 6,984,086 B1 | * | 1/2006 | Rothman et al. | 400/713 |

* cited by examiner

*Primary Examiner*—Daniel J. Colilla
*Assistant Examiner*—Kevin D. Williams
(74) *Attorney, Agent, or Firm*—Thomas, Kayden, Horstemeyer & Risley

(57) ABSTRACT

A keyboard. A keyboard subassembly is disposed on a base and moves between a first position and a second position. The keyboard subassembly provides a first angle of elevation when in the first position, and a second angle of elevation when in the second position. The first angle of elevation is less than the second angle of elevation.

13 Claims, 11 Drawing Sheets

KEYBOARDS

BACKGROUND

The invention relates to keyboards, and in particular to keyboards providing adjustment of angle of elevation and height.

Referring to FIG. 1A, a conventional keyboard 10 comprises a plurality of keys 12. The keyboard 10 can be provided with a predetermined inclined angle for ergonomic operation, providing a proper angle of elevation to the keys 12. Furthermore, as shown in FIG. 1B, when the predetermined inclined angle of the keyboard 10 is insufficient, an extra supporting shaft 13 disposed on the bottom thereof can be pulled out to support the keyboard 10, thereby increasing the inclined angle thereof.

As shown in FIG. 1B, the angle of elevation of the keyboard 10 can be adjusted only by means of the supporting shaft 13. The amount by which the angle of elevation of the keyboard 10 can be adjusted is thus fixed. Moreover, when the angle of elevation of the keyboard 10 is adjusted, the keyboard 10 must be lifted, the supporting shaft 13 must be pulled out from a recess on the bottom thereof and rotated to a predetermined position, creating inconvenience of use.

Hence, there is a need for keyboards providing simple and fast adjustment of angle of elevation and operational height.

SUMMARY

An exemplary embodiment of a keyboard comprises a base and a keyboard subassembly disposed thereon, and movable between a first position and a second position. The keyboard subassembly provides a first angle of elevation when in the first position, and a second angle of elevation when in the second position. The first angle of elevation is less than the second angle of elevation.

The keyboard subassembly provides a first operational height when in the first position, and a second operational height when in the second position. The first operational height is smaller than the second operational height.

The base comprises a sliding shaft, and the keyboard subassembly comprises a first sliding groove in which the sliding shaft slides.

The first sliding groove comprises a first end and a second end. The keyboard subassembly is in the first position when the sliding shaft slides to the first end, and the keyboard subassembly is in the second position when the sliding shaft slides to the second end.

The first sliding groove comprises a plurality of positioning springs. The sliding shaft is positioned in different positions in the first sliding groove by means of the positioning springs, respectively.

The keyboard further comprises a push rod movably disposed on the base to move the keyboard subassembly between the first position and the second position.

The keyboard subassembly provides a predetermined curvature.

The base comprises a curved recess providing a curvature corresponding to the predetermined curvature of the keyboard subassembly.

The base comprises a plurality of parallel protruding tracks on the curved recess, and the keyboard subassembly comprises a plurality of parallel second sliding grooves on the bottom thereof. The protruding tracks slide in the second sliding grooves.

DESCRIPTION OF THE DRAWINGS

The invention can be more fully understood by reading the subsequent detailed description and examples with references made to the accompanying drawings, wherein.

DETAILED DESCRIPTION

Figure 1A:
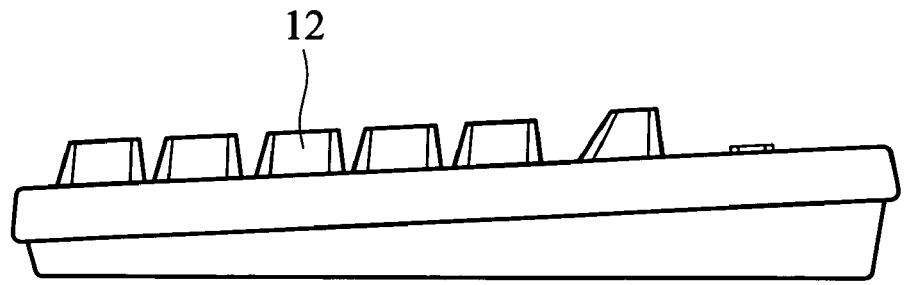
FIG. 1A is a schematic side view of a conventional keyboard in a first operational position.
Figure 1B:
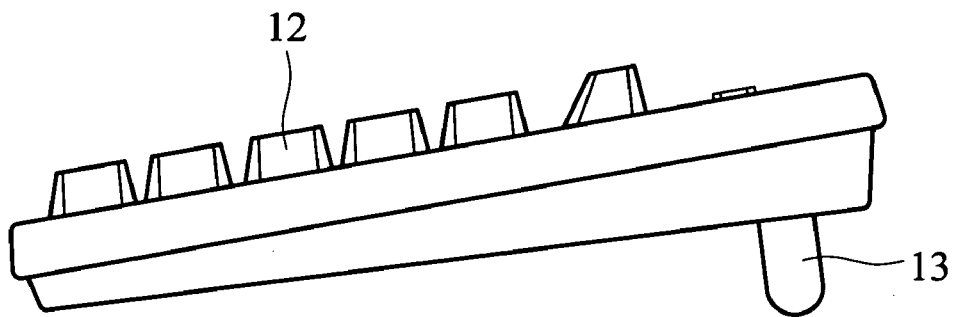
FIG. 1B is a schematic side view of the keyboard of FIG. 1A in a second operational position, at a higher angle of elevation.
Figure 2A:
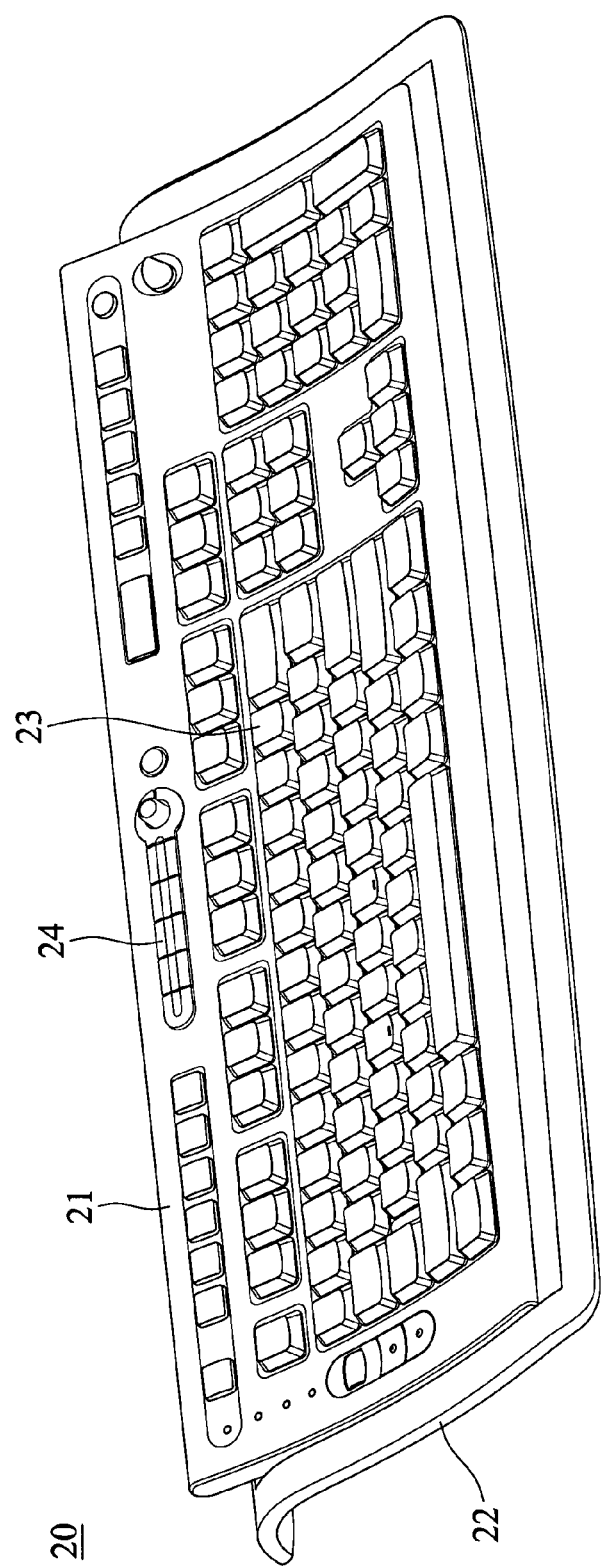
FIG. 2A is a schematic assembly view of an embodiment of a keyboard.
Figure 2B:
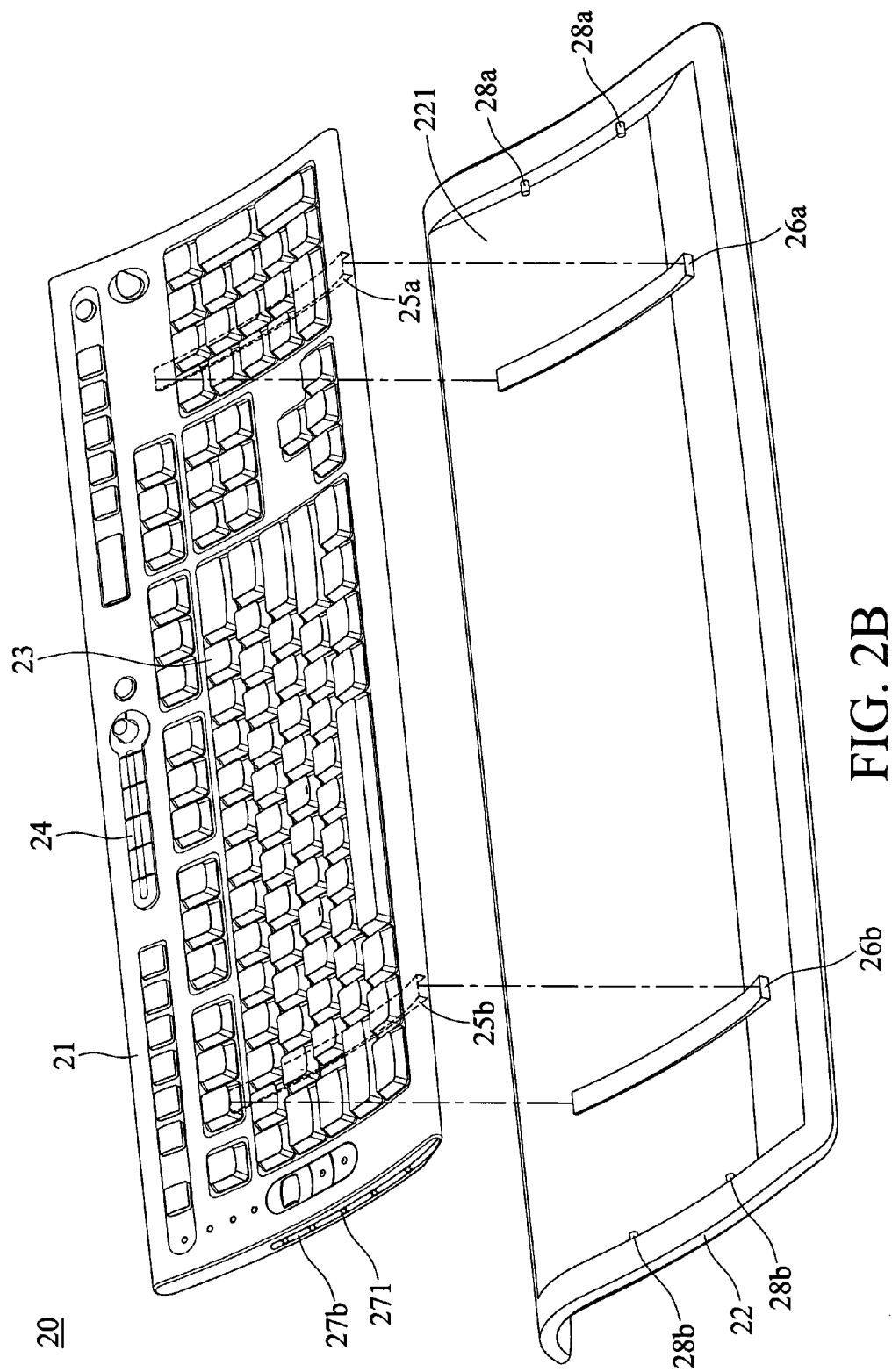
FIG. 2B is a schematic exploded view of FIG. 2A.

Referring to FIG. 2A and FIG. 2B, a keyboard 20 comprises a base 22 and a keyboard subassembly 21. The keyboard subassembly 21 provides a predetermined curvature and comprises multiple keys 23 and function keys 24 disposed on the curved surface thereof, providing ergonomic function. The base 22 is curved and comprises a curved recess 221 on the curved and top surface thereof. The curved recess 221 provides a curvature and width corresponding to those of the keyboard subassembly 21, such that the keyboard subassembly 21 can slide forward and backward in the curved recess 221.

Figure 3A:
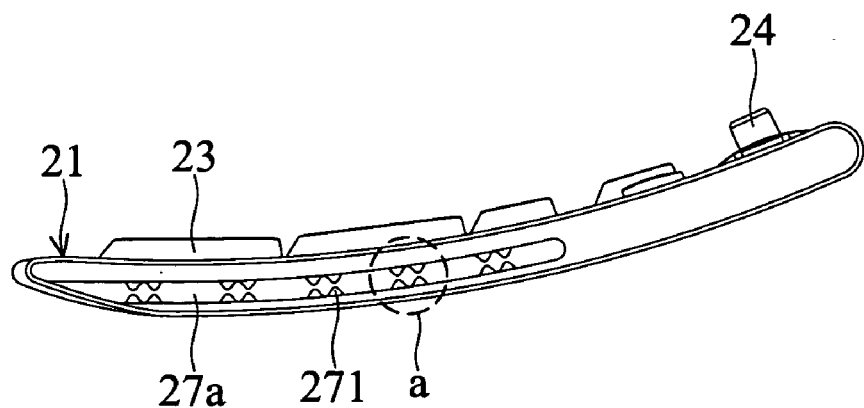
FIG. 3A is a schematic side view of a keyboard subassembly of FIG. 2B.

The base 22 comprises a plurality of sliding shafts 28a and 28b respectively disposed on opposite sides thereof. The keyboard subassembly 21 comprises two first sliding grooves 27a (as shown in FIG. 3A) and 27b respectively formed on opposite sides thereof. When the keyboard subassembly 21 is disposed on the base 22, the sliding shafts 28a and 28b respectively correspond to the first sliding grooves 27a and 27b. Accordingly, the sliding shafts 28a and 28b can respectively slide in the first sliding grooves 27a and 27b. Moreover, the base 22 comprises two parallel protruding tracks 26a and 26b on the curved recess 221, and the keyboard subassembly 21 comprises two parallel second sliding grooves 25a and 25b on the bottom thereof. The protruding tracks 26a and 26b correspond to and slide in the second sliding grooves 25a and 25b, respectively. Thus, the keyboard subassembly 21 can slide between a first position and a second position on the base 22. Specifically, the keyboard subassembly 21 provides a first angle of elevation and a first operational height when in the first position on the base 22. The keyboard subassembly 21 provides a second angle of elevation and a second operational height when in the second position on the base 22. The first and second angles of elevation are respectively the minimum and maximum angles of elevation, and the first and second operational heights are the minimum and maximum operational heights.

Figure 3B:
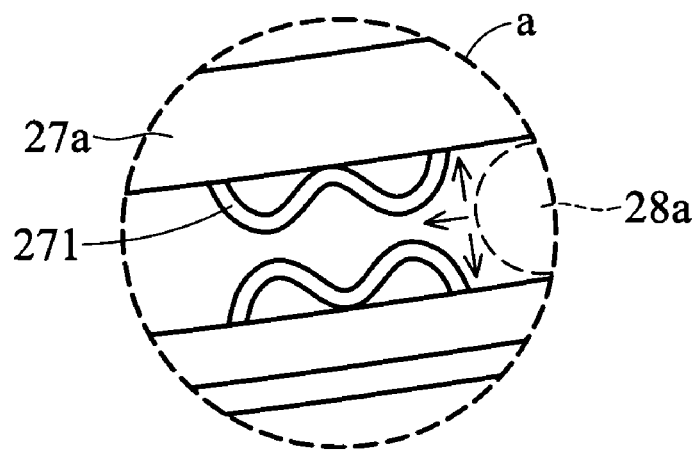
FIG. 3B is a partial enlarged view of FIG. 3A.

Referring to FIG. 3A and FIG. 3B, a plurality of positioning springs 271 are respectively disposed in the first sliding grooves 27a and 27b (not shown in FIG. 3A and FIG. 3B). When the keyboard subassembly 21 is pushed, the sliding shafts 28a and 28b respectively slide in the first sliding grooves 27a and 27b and compress the positioning springs 271. The sliding shafts 28a and 28b can take different positions in the first sliding grooves 27a and 27b by way of the positioning springs 271. Thus, different angles of elevation and operational heights are provided.

Figure 4A:
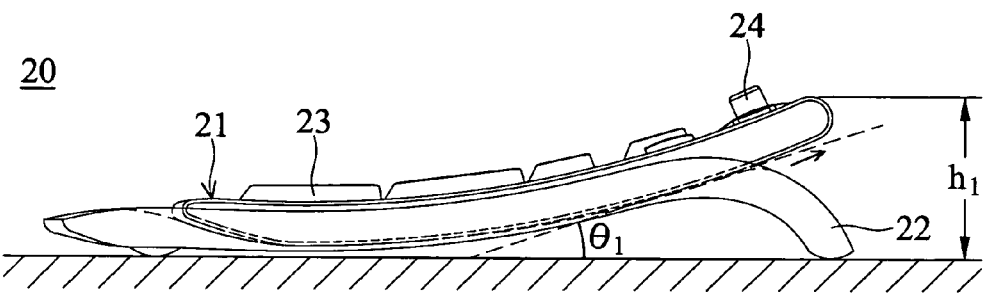
FIGS. 4A, 4B, and 4C show different angles of elevation for the keyboard of FIG. 2A.
Figure 4B:
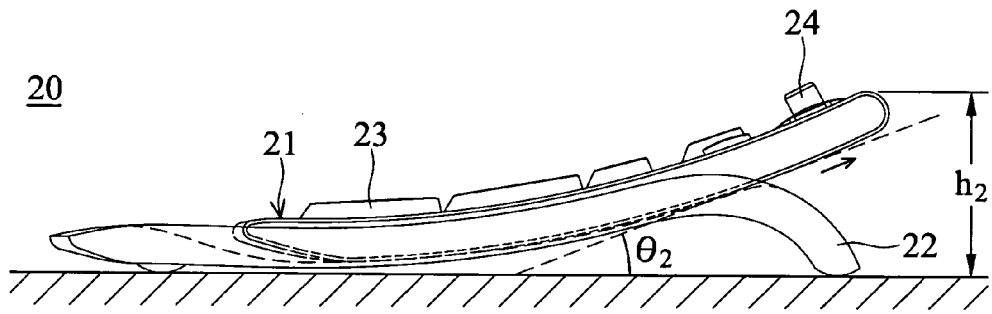
Figure 4C:
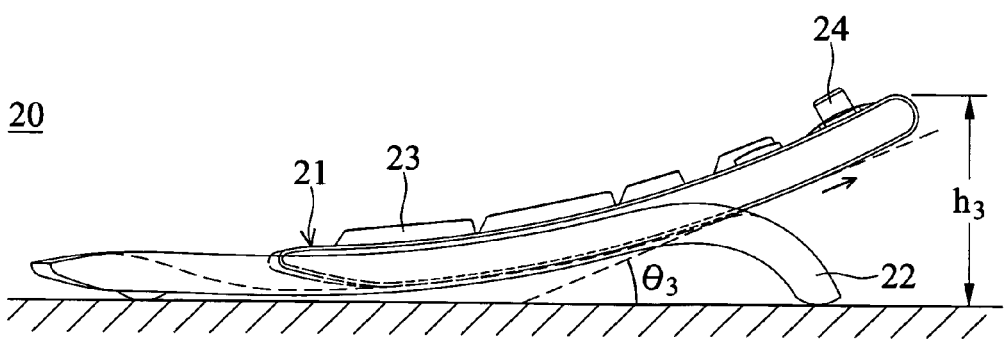

FIGS. 4A, 4B, and 4C show three different angles of elevation of the keyboard 20, although the keyboard 20 is not limited to only these three angles of elevation.

As shown in FIG. 3A and FIG. 4A, when the keyboard subassembly 21 is in the first position (on the base 22), the sliding shafts 28a and 28b are respectively positioned at one end of the first sliding grooves 27a and 27b by engaging the positioning springs 271. At this point, the keyboard 20 provides a minimum angle of elevation $\theta_1$ and a minimum operational height $h_1$.

As shown in FIG. 4B, when the angle of elevation of the keyboard 20 is adjusted, the keyboard subassembly 21 can be pushed forward. The sliding shafts 28a and 28b then disengage from the positioning springs 271 and slide in the first sliding grooves 27a and 27b. The sliding shafts 28a and 28b again engage the next positioning springs 271. At this point, the keyboard 20 provides an intermediate angle of elevation $\theta_2$ and an intermediate operational height $h_2$.

As shown in FIG. 4C, when the keyboard subassembly 21 is again pushed forward to the second position, the sliding shafts 28a and 28b slide in the first sliding grooves 27a and 27b and engage the next positioning springs 271. At this point, the keyboard 20 provides a maximum angle of elevation $\theta_3$ and a maximum operational height $h_3$.

The first sliding grooves 27a and 27b and sliding shafts 28a and 28b can be alternatively positioned. Namely, the first sliding grooves 27a and 27b can be disposed on opposite sides of the base 22, and the sliding shafts 28a and 28b can be disposed on opposite sides of the keyboard subassembly 21. Accordingly, the keyboard subassembly 21 can also slide or move on the base 22. Similarly, the second sliding grooves 25a and 25b and protruding tracks 26a and 26b can be alternatively positioned to provide the same positioning effect. Furthermore, one of the first sliding grooves 27a and 27b and one of the sliding shafts 28a and 28b can be omitted while providing the same effect. Similarly, one of the second sliding grooves 25a and 25b and one of the protruding tracks 26a and 26b can be omitted to provide the same positioning effect.

Figure 5:
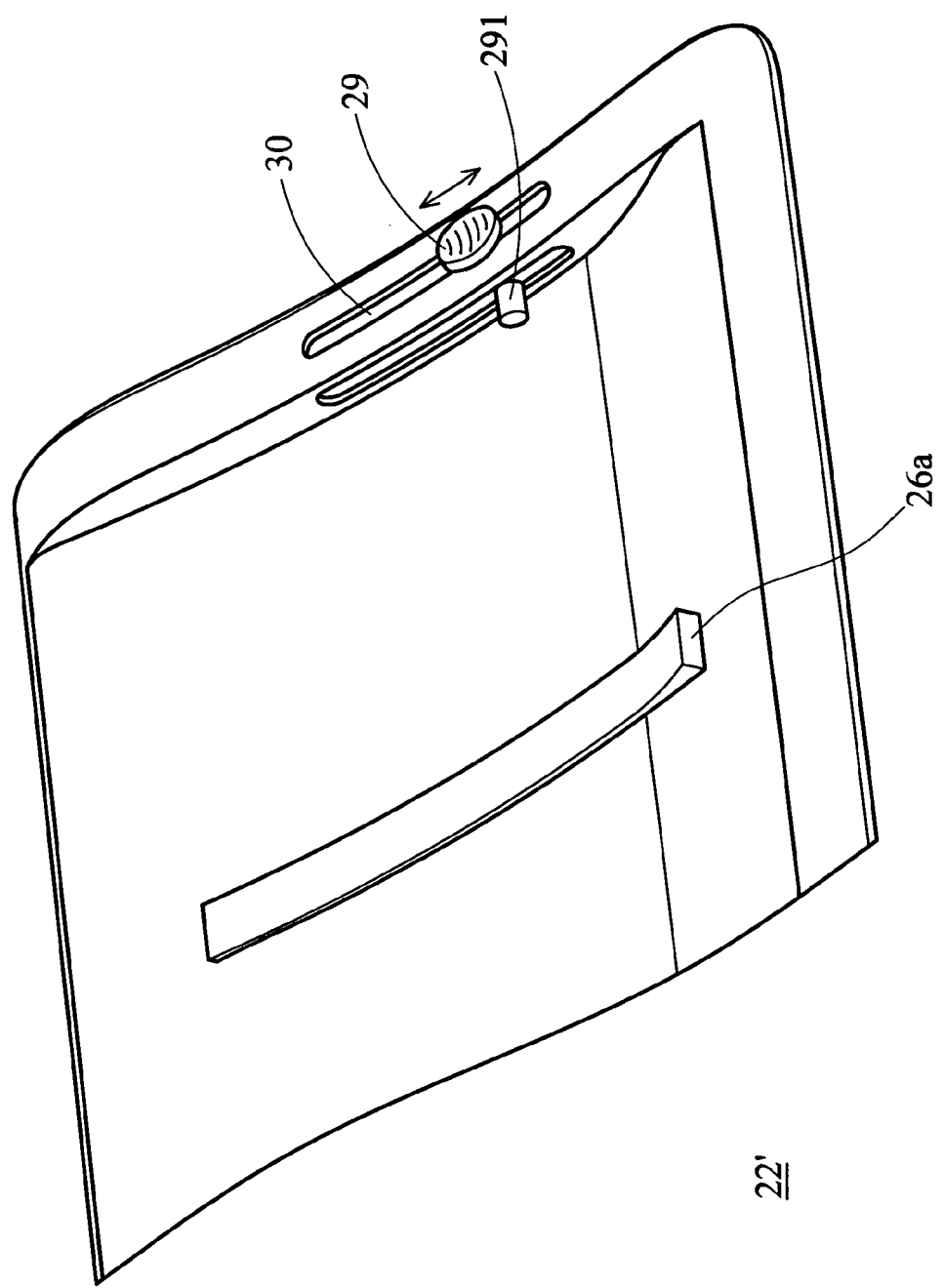
FIG. 5 is a partial view of the base of an embodiment of a keyboard.

Alternatively, as shown in FIG. 5, a base 22' can comprise two third sliding grooves 30 on opposite sides of the base 22', and two push rods 29 in the third sliding grooves 30, sliding therein. Additionally, each push rod 29 can be positioned in each third sliding groove 30 by means of a spring (not shown).

Each push rod 29 comprises a sliding shaft 291 engaging the keyboard subassembly 21. When the angle of elevation (or operational height) of the keyboard is adjusted, the push rods 29 are contacted, such that the sliding shafts 291 connected thereto move the keyboard subassembly 21 between the first position and the second position on the base 22'. The results of movement of the keyboard subassembly 21 are shown in FIGS. 4A, 4B, and 4C.

Figure 6A:
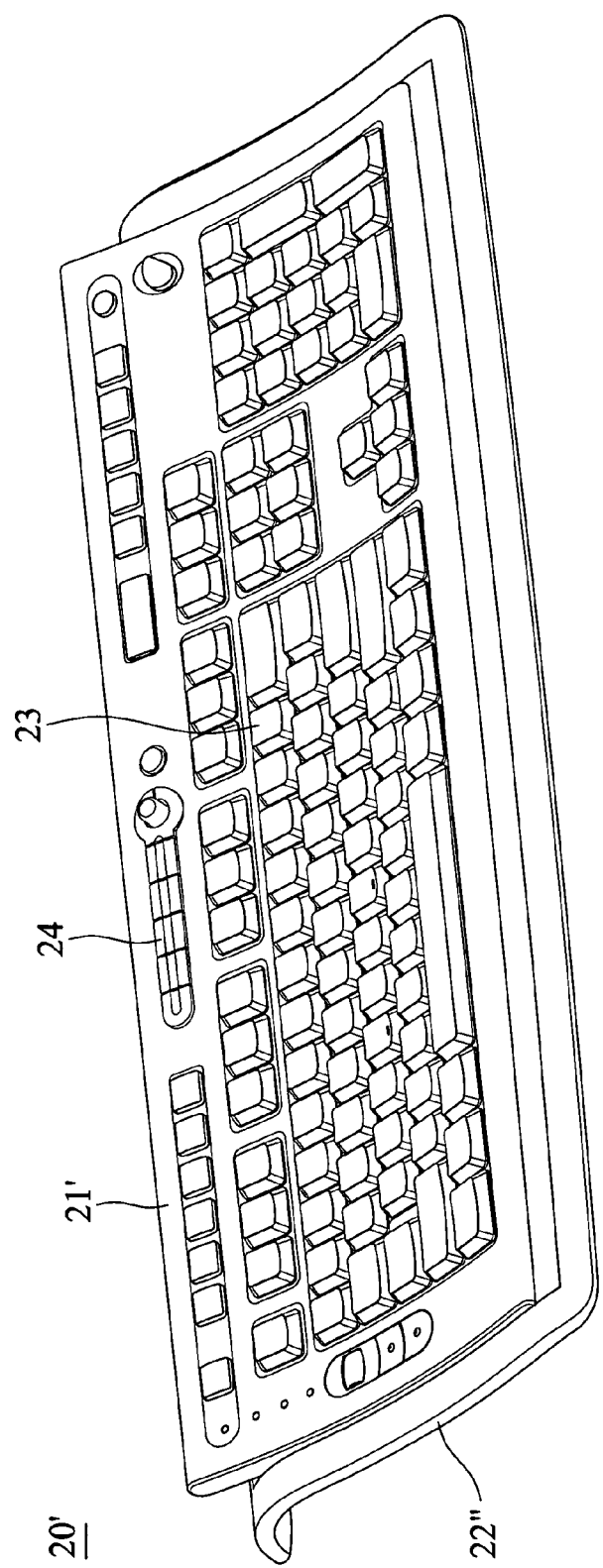
FIG. 6A is a schematic assembly view of an embodiment of a keyboard.
Figure 6B:
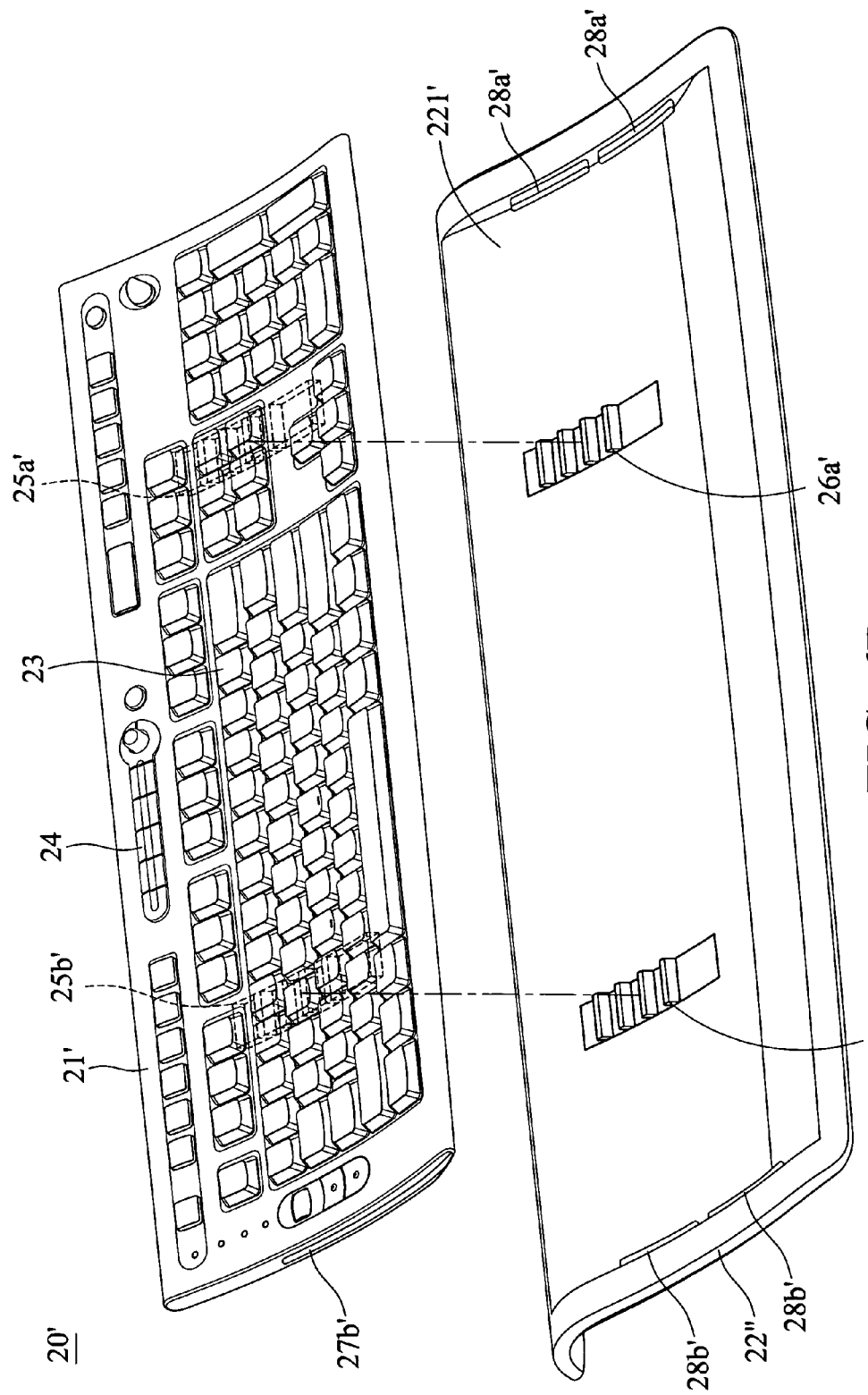
FIG. 6B is a schematic exploded view of FIG. 6A.

Further, as shown in FIG. 6A and FIG. 6B, a keyboard 20' can comprise a base 22" and a keyboard subassembly 21', providing a predetermined curvature and multiple keys 23 and function keys 24 disposed on the curved and top surface thereof, providing ergonomic function. The base 22" is curved and comprises a curved recess 221' on the top surface thereof, with a curvature and width corresponding to those of the keyboard subassembly 21', such that the keyboard subassembly 21' can slide in the curved recess 221'.

Figure 7A:
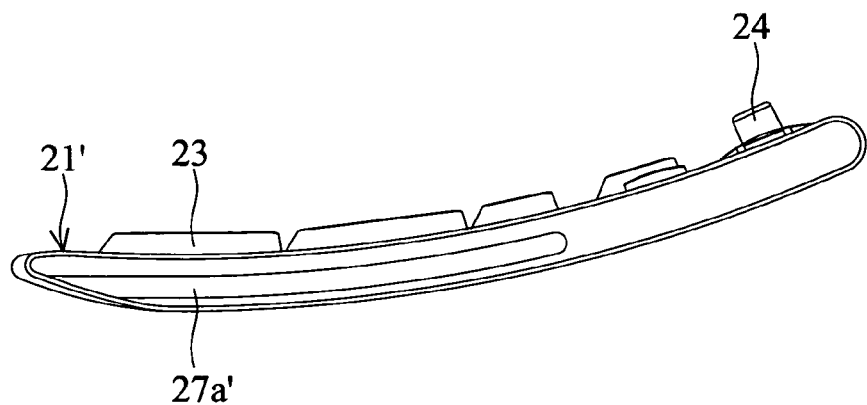
FIG. 7A is a schematic side view of a keyboard subassembly of FIG. 6B.

The base 22" comprises a plurality of protruding ribs 28a' and 28b' respectively disposed on opposite sides thereof. The keyboard subassembly 21' comprises two curved sliding grooves 27a' (as shown in FIG. 7A) and 27b' respectively formed on opposite sides thereof. When the keyboard subassembly 21' is disposed on the base 22", the protruding ribs 28a' and 28b' respectively correspond to the sliding grooves 27a' and 27b', sliding therein. Thus, the keyboard subassembly 21' of the keyboard 20' can slide on the base 22" and provide different angles of elevation and operational heights.

As shown in FIG. 6B and FIG. 7A, the protruding ribs 28a' and 28b' provide a curvature corresponding to that of the sliding grooves 27a' and 27b', such that the protruding ribs 28a' and 28b' can slide in the sliding grooves 27a' and 27b' and the keyboard subassembly 21' can thereby be positioned on the base 22". Additionally, one end of each sliding groove 27a' and one end of each sliding groove 27b' are open, such that the keyboard subassembly 21' can be removed from the base 22".

Figure 7B:
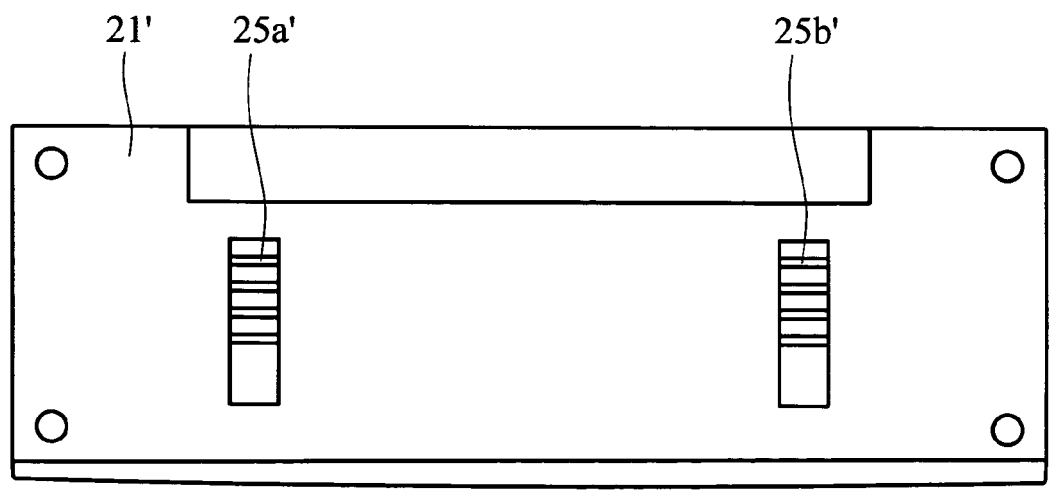
FIG. 7B is a bottom view of FIG. 7A.

As shown in FIG. 6B and FIG. 7B, the base 22" comprises two parallel arrays of protrusions 26a' and 26b' on the curved recess 221', and the keyboard subassembly 21' comprises two parallel arrays of recesses 25a' and 25b' on the bottom thereof. The positions of the protrusions 26a' and 26b' correspond to those of recesses 25a' and 25b', respectively. The protrusions 26a' and 26b', of rubber, interfere with the recesses 25a' and 25b' to generate positive interval response when the keyboard subassembly 21' is disposed on and slides on the base 22". When the keyboard subassembly 21' slides on the base 22", different angles of elevation and operational heights are thereby provided.

Figure 8A:
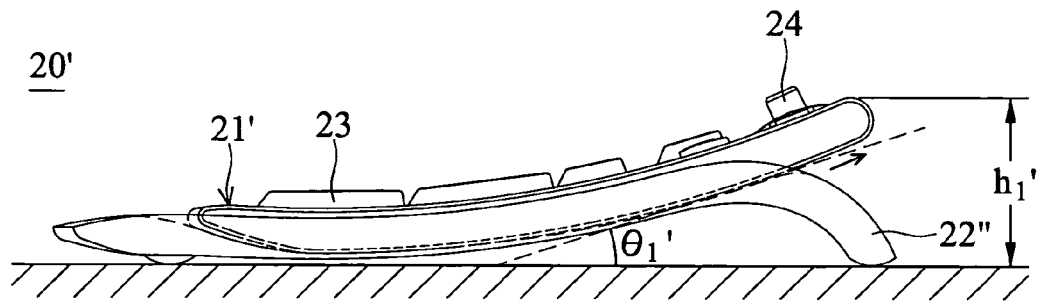
FIGS. 8A, 8B, and 8C show different angles of elevation of the keyboard of FIG. 6A.
Figure 8B:
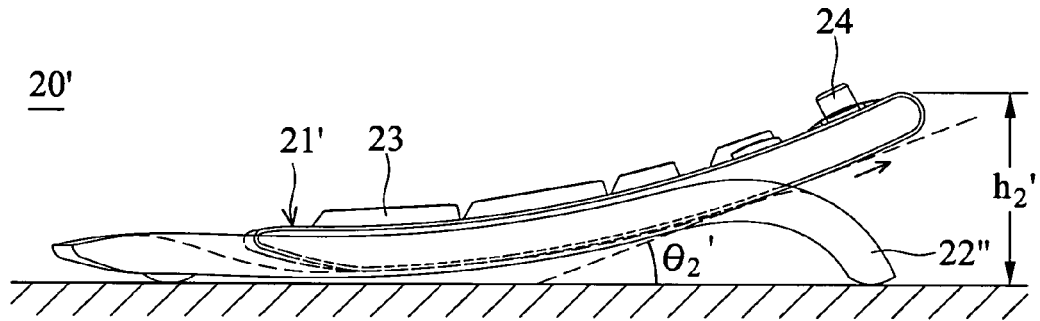
Figure 8C:
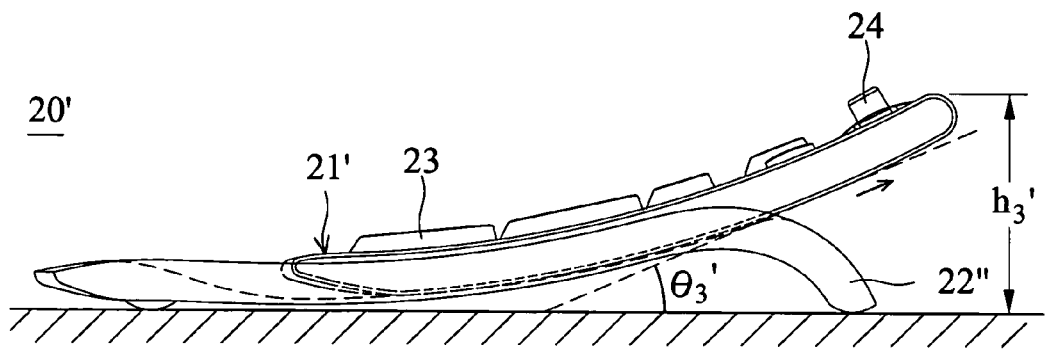

FIGS. 8A, 8B, and 8C show three different angles of elevation of the keyboard 20', although the keyboard 20' is not limited thereto.

As shown in FIG. 7A and FIG. 8A, when the keyboard subassembly 21' is in a first position (on the base 22"), the protruding ribs 28a' and 28b' are respectively positioned in one end of the curved sliding grooves 27a' and one end of the curved sliding grooves 27b'. At this point, the keyboard 20' provides a minimum angle of elevation $\theta_1'$ and a minimum operational height $h_1'$.

As shown in FIG. 8B, when the angle of elevation of the keyboard 20' is adjusted, the keyboard subassembly 21' can be pushed forward. The protruding ribs 28a' and 28b' then slide in the curved sliding grooves 27a' and 27b'. The protrusions 26a' and 26b' interfere with the recesses 25a' and 25b', advancing the keyboard subassembly 21' at an interval. At this point, the keyboard 20' provides an intermediate angle of elevation $\theta_2'$ and an intermediate operational height $h_2'$.

As shown in FIG. 8C, when the keyboard subassembly 21' is pushed further forward to a second position, the protruding ribs 28a' and 28b' slide in the curved sliding grooves 27a' and 27b' and the rubber protrusions 26a' and 26b' of the base 22" interfere with the next recesses 25a' and 25b'. At this point, the keyboard 20' provides a maximum angle of elevation $\theta_3'$ and a maximum operational height $h_3'$.

Figure 9:
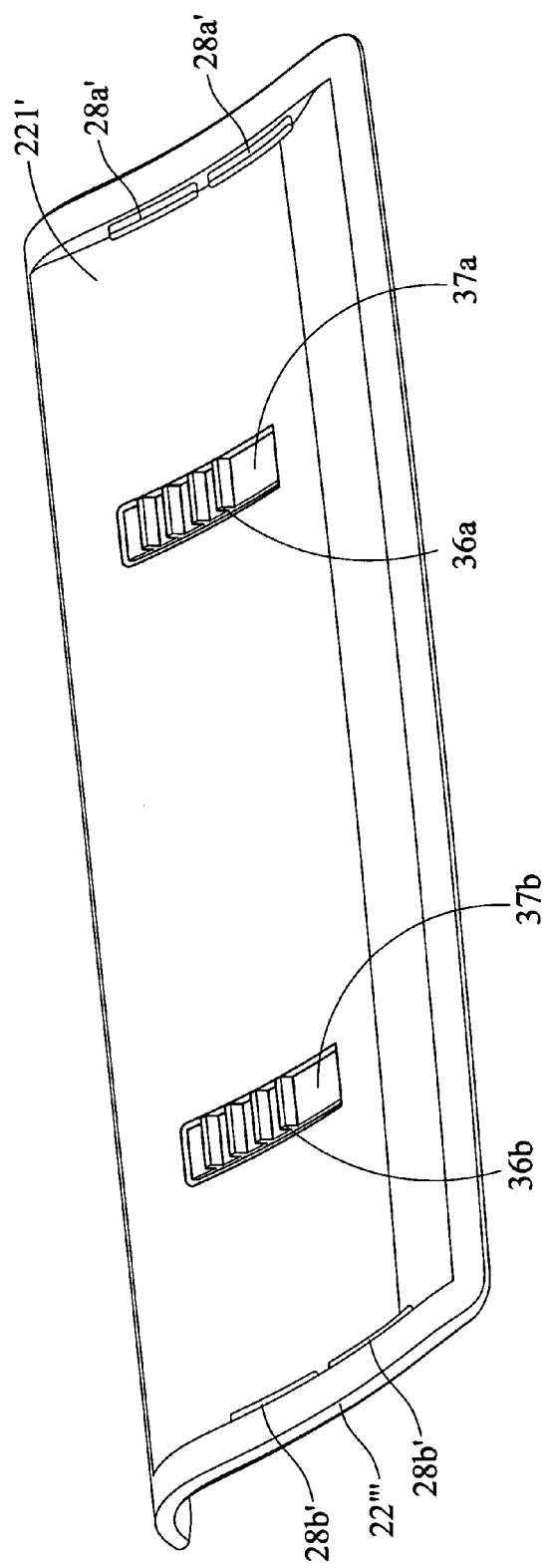
FIG. 9 is a schematic perspective view of the base of an embodiment of a keyboard.

As well, as shown in FIG. 9, a base 22''' can comprise two resilient arms 37a and 37b integrally formed therein. Two arrays of protrusions 36a and 36b are respectively disposed on the resilient arms 37a and 37b. When the protrusions 36a and 36b interfere with the recesses 25a' and 25b' of the keyboard subassembly 21', the protrusions 36a and 36b are moved downward by the resilient arms 37a and 37b. Positive interval response is thus generated when the keyboard subassembly 21' slides on the base 22'''. Additionally, when the keyboard subassembly 21' slides on the base 22''', different angles of elevation and operational heights are thereby provided.

Moreover, the curved sliding grooves 27a' and 27b' and protruding ribs 28a' and 28b' can be alternatively positioned. Namely, the curved sliding grooves 27a' and 27b' can be disposed on opposite sides of the base 22'' (base 22''') while the protruding ribs 28a' and 28b' can be disposed on opposite sides of the keyboard subassembly 21'. Accordingly, the keyboard subassembly 21' can also slide or move on the base 22'' (base 22'''). Similarly, the recesses 25a' and 25b' on the bottom of the keyboard subassembly 21' and protrusions 26a' and 26b' (protrusions 36a and 36b) disposed on the curved recess 221' can be alternatively positioned to provide the same positioning effect.

In conclusion, embodiments of a keyboard provide a detachable and curved keyboard subassembly and base. The angle of elevation and operational height of the keyboard can be quickly adjusted by simply pushing the keyboard subassembly, and the disclosure may thereby enhance convenience of operation, complying with different operational requirements.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A keyboard, comprising: a base; and a keyboard subassembly disposed on the base and moving between a first position and a second position, wherein the keyboard subassembly provides a first angle of elevation when in the first position, and a second angle of elevation when in the second position, and the first angle of elevation is less than the second angle of elevation, and wherein the base further comprises a sliding shaft, and the keyboard subassembly further comprises a first sliding groove in which the sliding shaft slides, wherein the first sliding groove further comprises a plurality of positioning springs, and the sliding shaft achieves different positions in the first sliding groove by means of the positioning springs, respectively.

2. The keyboard as claimed in claim 1, wherein the keyboard subassembly provides a first operational height when in the first position, and a second operational height when in the second position, and the first operational height is smaller than the second operational height.

3. The keyboard as claimed in claim 1, wherein the first sliding groove further comprises a first end and a second end, such that the keyboard subassembly is in the first position when the sliding shaft slides to the first end, and in the second position when the sliding shaft slides to the second end.

4. The keyboard as claimed in claim 1, further comprising a push rod movably disposed on the base, moving the keyboard subassembly between the first position and the second position.

5. The keyboard as claimed in claim 1, wherein the keyboard subassembly provides a predetermined curvature.

6. The keyboard as claimed in claim 5, wherein the base further comprises a curved recess providing a curvature corresponding to the predetermined curvature of the keyboard subassembly.

7. The keyboard as claimed in claim 6, wherein the base further comprises a plurality of parallel protruding tracks on the curved recess, the keyboard subassembly further comprises a plurality of parallel second sliding grooves on the bottom thereof, and tile protruding tracks slide in the second sliding grooves.

8. A keyboard, comprising: a base; and a keyboard subassembly disposed on the base, moving between a first position and a second position, wherein the keyboard subassembly provides a first operational height when in the first position, and a second operational height when in the second position, and the first operational height is smaller than the second operational height, and wherein the base further comprises a sliding shaft, and the keyboard subassembly further comprises a first sliding groove in which the sliding shaft slides wherein the first sliding groove further comprises a plurality of positioning springs, and the sliding shaft achieves different positions in the first sliding groove by means of the positioning springs, respectively.

9. The keyboard as claimed in claim 8, wherein the first sliding groove further comprises a first end and a second end, such that the keyboard subassembly is in the first position when the sliding shaft slides to the first end, and in the second position when the sliding shaft slides to the second end.

10. The keyboard as claimed in claim 8, further comprising a push rod movably disposed on the base, moving the keyboard subassembly between the first position and the second position.

11. The keyboard as claimed in claim 8, wherein the keyboard subassembly provides a predetermined curvature.

12. The keyboard as claimed in claim 11, wherein the base further comprises a curved recess, and the curvature of the curved recess corresponds to the predetermined curvature of the keyboard subassembly.

13. The keyboard as claimed in claim 12, wherein the base further comprises a plurality of parallel protruding tracks on the curved recess, the keyboard subassembly further comprises a plurality of parallel second sliding grooves on the bottom thereof, and the protruding tracks slide in the second sliding grooves.

* * * * *